*Hatch & Churchill,*
*Cutting Leather,*
Nº 12,128.   Patented Jan. 2, 1855.
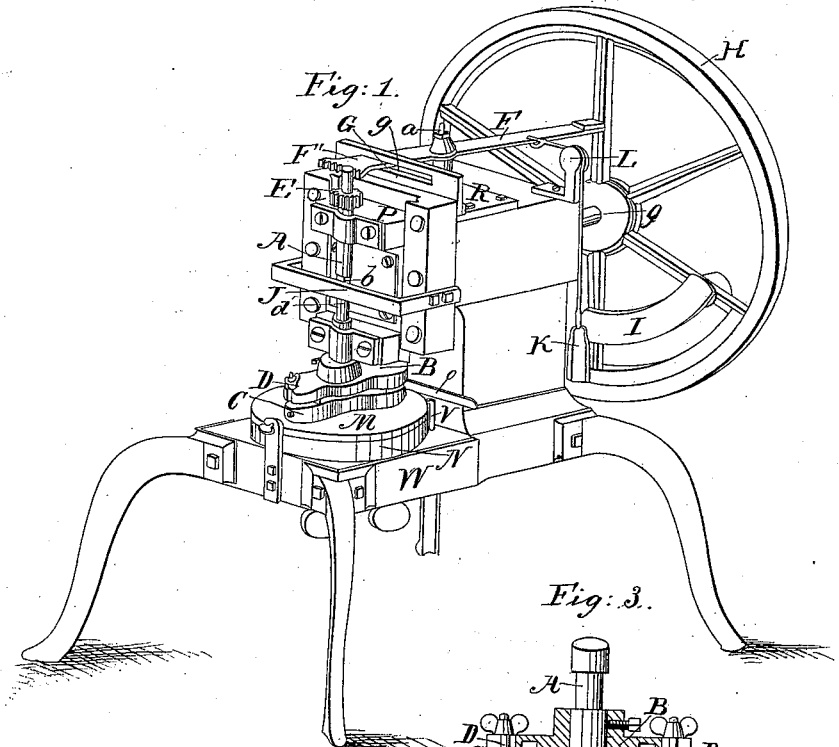
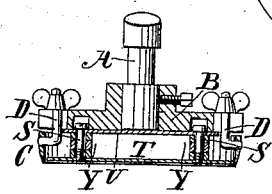
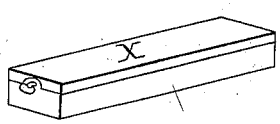
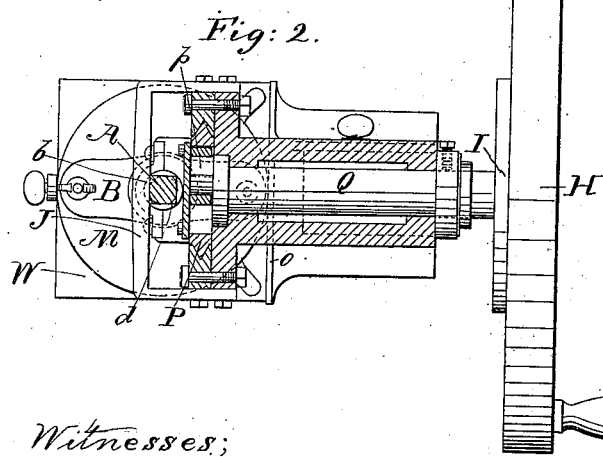
Witnesses;
John Cowles
Lyman Churchill
Inventor;
Jesse B. Hatch
Henry Churchill

UNITED STATES PATENT OFFICE.

JESSE W. HATCH AND HENRY CHURCHILL, OF ROCHESTER, NEW YORK.

MACHINE FOR CUTTING OUT BOOT AND SHOE SOLES.

Specification forming part of Letters Patent No. 12,128, dated January 2, 1855; Reissued July 24, 1866, No. 2,321.

*To all whom it may concern:*

Be it known that we, JESSE W. HATCH and HENRY CHURCHILL, of Rochester, in the county of Monroe and State of New York, have invented certain new and useful Improvements in Machines for Cutting Out Leather, Cloth, India-Rubber, and other Materials; and we do hereby declare that the following is a full, clear, and exact description of the same, reference being had to the accompanying drawings, forming part of this specification, in which—

Figure 1, is a perspective view of a machine constructed according to our invention, for cutting out soles for shoes. Fig. 2, is a longitudinal section of the same. Fig. 3, is a longitudinal section of the knife or punch, and the device which discharges the pieces of material therefrom after the cutting operation. Fig. 4, is a perspective view of the device which discharges the pieces from the knife or punch. Fig. 5, is a perspective view of a cutting block or table of a different description to that shown in the machine.

Similar letters of reference indicate corresponding parts in the several figures.

In this machine, pieces of material of any desired shape are cut by means of an endless edged knife of the desired form, or as it is sometimes called, a punch, from similarity of its action, attached to a shaft which receives a reciprocating rectilinear motion. Machines having a similar action, we are aware, have been used for similar purposes, but as usually constructed, those machines have some important defects which it is the object of our improvements to remedy.

Our improvement consists, in giving to the reciprocating shaft at some convenient point in its reciprocating motion, one half of a revolution, on its axis, to change the position of the punch for the purpose of cutting out articles or pieces which are of different widths at opposite ends, without such waste as must occur in cutting such articles or pieces where the punch has no such motion.

To enable those skilled in the art to make and use our invention, we will proceed to describe its construction and operation.

A, is the punch shaft carrying at its lower end, a shoe B, to which the punch C, is secured by hook bolts D, D, which are adjustable in slots in the shoe and are secured in place by nuts above. The shaft A, is provided with journals which fit in suitable boxes, secured to the front of a slide P, which fits in vertical guides attached to the framing of the machine, and receives a reciprocating rectilinear motion from an eccentric pin $p$, on the longitudinal driving shaft Q. Near the top of the shaft A, is secured a small spur wheel E, which, when the shaft is in its highest position gears with a toothed segment F', on the front end of a horizontal lever F, of the first order, whose fulcrum is a vertical stud $a$, secured to a plate R, which is bolted so as to be adjustable on the top of the framing of the machine. When the wheel is brought by the ascent of the shaft A, into gear with the segment F', the latter is always in the position represented in Fig. 1, in contact with the left hand end of a slot $g$, in a plate G, attached to the framing, where it is held by a weight K, which is attached to its back end by a cord passing over a pulley supported in a standard L.

Every time the shaft A, arrives at or nearly at its highest position, the back end of the lever F, is struck by a cam I, on the fly wheel H, of the driving shaft, and is moved over to the left, causing the segment to move to the right far enough to give the shaft half a revolution, and to hold it until it has descended far enough for the front face of a squared part $b$, to come in contact with the inner face of a bar J, which is bolted in front of the framing to serve as a guide to prevent the shaft turning except when desired, at which time the squared part has been raised above the bar J, and a smaller round portion $d$, (shown dotted in Fig. 2,) of the shaft, is brought opposite to it. As soon as the square on the shaft comes in contact with the bar J, the cam passes the lever, and the segment F', being immediately after left free from the wheel E, by the descent of the latter with the shaft, is thrown over to the left by the action of the weight K, on the lever, and is ready to gear with the wheel E, on its next ascent. It is desirable, though not indispensable, that a movable stop piece be attached to the left hand end of the slot $g$, as then by properly adjusting this piece, the stoppage of the segment in exactly the right position for the wheel to strike into gear with it, can be made quite certain.

The leather or material to be cut is placed in one or more sheets upon a block M, of wood, lead or other solid material not capable of injuring the cutting edge of the punch, which is confined by dogs and set screws in a cast iron cup N, which is placed on the bed piece W, of the machine, where it is adjusted to the proper height and level by means of screws working through the bed piece. The position of the material which is of a proper width to cut the articles desired, is regulated by an adjustable gage O, secured to the framing; and it is fed across the cutting block M, by hand or by any mechanical feed motion. Instead of the block M, a long iron table having a recess in its face to receive a block X, see Fig. 5, may be used, the material being placed in a fixed position thereon, and the feed being effected by moving the table along on the bed W, either by hand or mechanical means.

The spring discharging plate T, for discharging the piece or article cut, from the interior of the punch is nearly as large as the inside of the punch, and is attached by screw bolts S, S, to another plate V, which is clamped between the shoe B, and the top or back of the punch C, by the bolts D, D. The springs Y, Y, which keep the plate T, in proper position, so that when the punch is not in operation, the said plate will stand just within its edge as shown in Fig. 3, consist of india rubber rings which surround the screw bolts S, S, but steel springs may be substituted therefor. When the cutting edge of the punch is caused by the pressure it receives from the eccentric pin, to enter the leather or material, the face of the plate T, is brought down upon that part of the leather or material within the edge and holds it firmly upon the bed remaining stationary during the continued descent of the punch and having the springs Y, Y, compressed; but when the punch rises the plate T, does not rise with it, but remains stationary upon the material until it has, by expanding in the direction in which it was previously compressed, forced the piece or pieces of leather or material from the punch. During the continued descent of the punch after the arrest of the plate T, the heads of the screw bolts S, S, work up into holes provided for them in the face of the shoe.

Having thus fully described our invention, we will now proceed to state what we claim as new and desire to secure by Letters Patent.

We claim—

Giving the cutting knife or punch C, half a revolution on its axis after every cutting operation, substantially as described, by any suitable mechanical means, for the purpose of reversing its position for the next cut, and thereby, when its ends are of unequal width, preventing the waste which, without some such provision, would be unavoidable.

JESSE W. HATCH.
HENRY CHURCHILL.

Witnesses:
LYMAN CHURCHILL,
ARTHUR CHURCHILL.

[FIRST PRINTED 1913.]